US011037204B1

United States Patent
Medina-Peralta et al.

(10) Patent No.: US 11,037,204 B1
(45) Date of Patent: Jun. 15, 2021

(54) CONTENT BIDDING SIMULATOR

(71) Applicant: Amazon Technologies, Inc., Reno, NV (US)

(72) Inventors: Jose Antonio Medina-Peralta, Huntington, NY (US); Yatin Sunil Deshpande, Jersey City, NJ (US); Matias Sebastian Larre Borges, Weehawken, NJ (US); Daniel Cerutti, Suffolk, NY (US); Binh D. Vo, New York, NY (US); Unmil Tambe, Somerset, NJ (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 553 days.

(21) Appl. No.: 15/671,912

(22) Filed: Aug. 8, 2017

(51) Int. Cl.
*G06Q 30/02* (2012.01)

(52) U.S. Cl.
CPC ..... *G06Q 30/0275* (2013.01); *G06Q 30/0242* (2013.01)

(58) Field of Classification Search
CPC combination set(s) only.
See application file for complete search history.

(56) References Cited

U.S. PATENT DOCUMENTS

| | | | |
|---|---|---|---|
| 8,195,804 B1 * | 6/2012 | Chaine | H04L 43/08 709/226 |
| 2006/0143082 A1 * | 6/2006 | Ebert | G06Q 30/02 705/14.72 |
| 2008/0021791 A1 * | 1/2008 | Steelberg | G06Q 30/0267 705/14.68 |
| 2009/0171728 A1 * | 7/2009 | Yan | G06Q 30/02 705/14.48 |
| 2011/0246298 A1 * | 10/2011 | Williams | G06Q 30/0275 705/14.53 |
| 2011/0313851 A1 * | 12/2011 | Athey | G06Q 30/0275 705/14.46 |
| 2012/0130828 A1 * | 5/2012 | Cooley | G06Q 30/0275 705/14.71 |
| 2014/0108159 A1 * | 4/2014 | Hughes | G06Q 30/0275 705/14.71 |
| 2015/0112795 A1 * | 4/2015 | Jalali | G06Q 30/0275 705/14.48 |
| 2017/0053322 A1 * | 2/2017 | Dixit | G06Q 30/0275 |
| 2018/0108049 A1 * | 4/2018 | Kitts | G06Q 30/0272 |

FOREIGN PATENT DOCUMENTS

WO  WO-2012012342 A2 *  1/2012  ............. G06Q 30/02

OTHER PUBLICATIONS

Feldman et al, Budget optimization in search-based advertising auctions, EC'07, Jun. 11-15, 2007, p. 40-49 (Year: 2007).*

* cited by examiner

*Primary Examiner* — Marie P Brady
(74) *Attorney, Agent, or Firm* — Hogan Lovells US LLP

(57) ABSTRACT

A computing device is configured to display content using a set of rules for individual content campaigns. The set of rules are provided with parameters determined from a simulated budget. Simulated bidding traffic is provided. Weighted bid traffic is generated based on evaluating the simulated bidding traffic with the set of rules. Qualified bid requests are provided from using the weighted bid traffic and updates to the parameters of the simulated budget. The qualified bid requests are applied to content servers to secure content slots for displaying content.

17 Claims, 8 Drawing Sheets

CONTENT BIDDING SIMULATOR

BACKGROUND

Electronic content marketplaces include buyers and sellers. The sellers may include websites (and related systems and agencies) with available real estate to provide content and the buyers may be paid content publishers who wish to publish paid content on the sellers' websites. In an instance, an owner of a domain is a seller of electronic content real estate for publishing content on the domain's websites or webpages, while the paid content publisher is a buyer of the electronic content real estate for providing paid content. The buyers and sellers interact via an electronic content exchange, where one or more servers are configured to provide real time bidding auctions, among multiple buyers, for the seller's electronic content real estate. Bids are submitted in real time and paid content publishers with the highest bid conventionally win the right to have their corresponding paid content displayed on the seller's electronic content real estate.

BRIEF DESCRIPTION OF THE DRAWINGS

Various embodiments in accordance with the present disclosure will be described with reference to the drawings, in which.

DETAILED DESCRIPTION

Figure 1A:
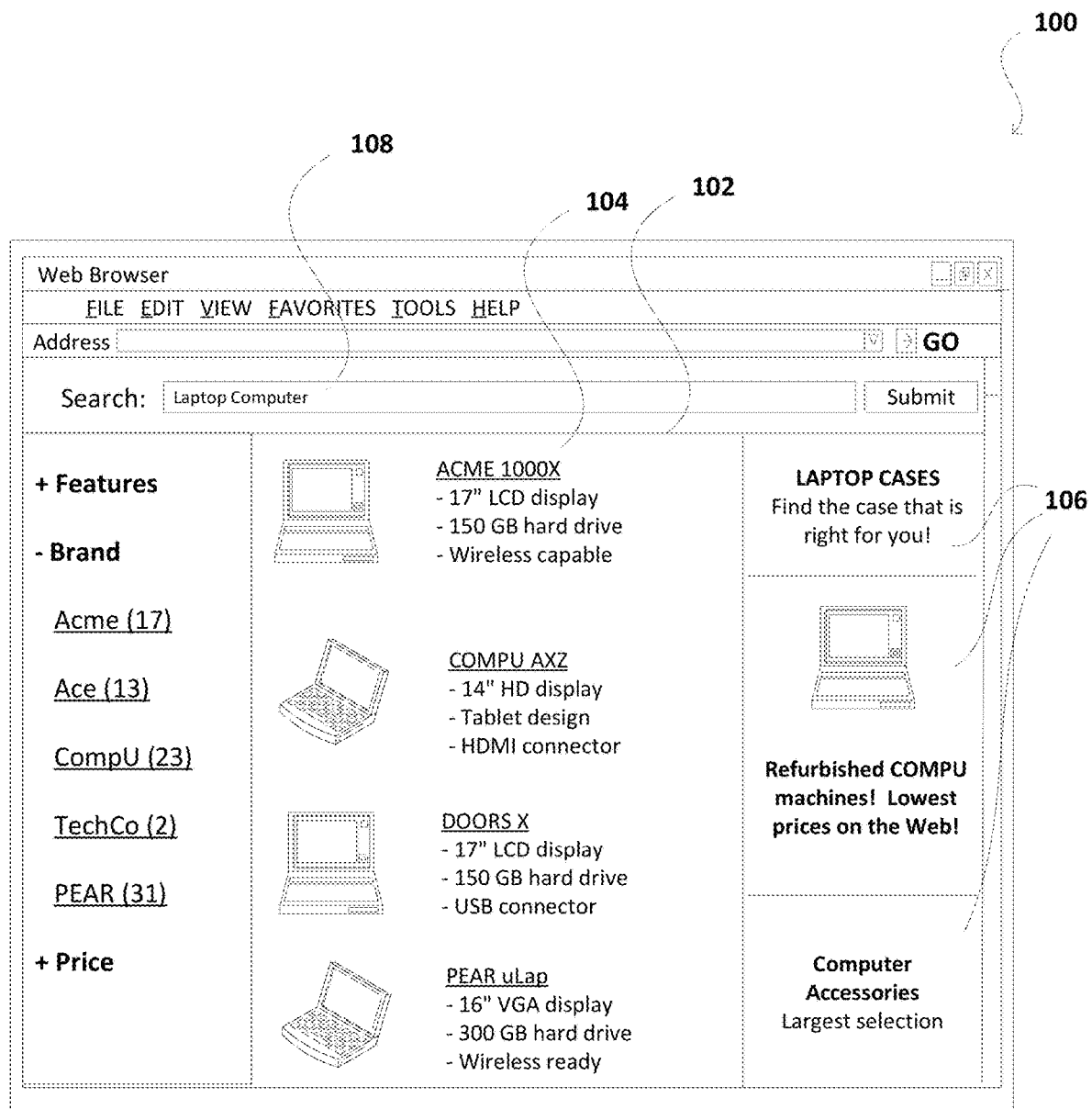
FIG. 1A illustrates a browser window with a website representing electronic content real estate to which providers' content may be added, in accordance with an example of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the foregoing or other deficiencies experienced in conventional approaches for determining an appropriate commitment value, such as a bid price, as well as other factors for a request to present paid content or sponsored content, such as advertisements, via an electronic device. In particular, various embodiments provide for dynamically generating recommendations to satisfy constraints set by paid or sponsored content providers (e.g., advertisers) and/or publishers based at least on market dynamics in response to a request to provide media. In an embodiment, electronic auctions can require advertisement/bidding exchanges or other such media exchanges to evaluate various constraints (e.g., maximum bid price) imposed by the paid content providers (e.g., advertisers) when attempting to determine which paid content provider wins the auction and, as a result, has their advertisement or other media displayed on an unpaid content publishers' website (e.g, provider of original content, news websites, electronic stores, forums, social media, video websites, etc.).

In an example application, when the content is advertising, individual advertising campaigns are provided with a set of rules determined from a simulated campaign budget. The set of rules define one or more bidding engines and are a function of the campaign parameters from the simulated campaign budget. For example, the set of rules may include simulated bid requests, simulated interactions, and simulated first time periods intended for displaying advertisements of the individual advertising campaigns. Each of the set of rules may correspond to a bidding engine. Simulated traffic patterns are provided in accordance to various test patterns, including in accordance with popular electronic shopping holidays or new product releases. Such traffic patterns may be obtained from historical traffic patterns to one or more unpaid content providers' webpages. Intermediate data of weighted bid traffic is generated based on evaluating the simulated traffic patterns with the set of rules. Qualified bid requests are provided from the intermediate data using the weighted bid traffic and using updates to at least one of the campaign parameters. The qualified bid requests are applied to advertisement servers to secure advertisement slots for displaying advertisements for the individual advertising campaign in real time. The set of rules, therefore, allow computers to provide accurate and realistic bid requests from simulated content campaigns to real time content campaigns that was previously based on conjecture and that no manual process could replicate.

In accordance with various embodiments, bidding traffic can refer to the bids received during real time bidding or auction for displaying content from multiple publishers. In an example, bidding traffic is usually higher for a seller or domain owner capable of providing targeted user information for users of their webpages. The seller or the domain owner, using tracking software, may be able to provide personal browsing habits for their users to attract paid content publishers, also referred to herein as a paid providers. The personal browsing habits correspond to information that helps paid content publishers target users with paid content and which may result in higher bidding traffic to the seller or the domain owner's websites. In another example, seasonal online shopping habits cause variations in bidding traffic to an online shopping website and may drive up prices for paid content on the online shopping website. Computers and servers involved in the simulated bidding processes are agnostic to simulated bidding data, unless instructed in the manner described herein. Such computers and servers have no context or understanding on bidding processes, either real time or simulated, and cause a high level of uncertainty in utilization of electronic content real estate.

In an implementation, certain publishers, domain owners, or websites provide unpaid content—e.g., news websites, social media, online stores, forums, and other original content websites. For clarity, publishers offering to publish unpaid (e.g., original or organic) content are referred to herein as unpaid content publishers or providers (or unpaid providers), and their content is unpaid content for purposes of publishing on these websites. These unpaid content publishers or providers may accept monetary benefits from users of their webpages or services, but their unpaid content is published for their users (as original content) and not typically for unrelated parties. Differently, paid content providers or publishers provide payment to unpaid content publishers or to a related third-party, to publish paid content in the electronic content real estate of the unpaid content publishers. Accordingly, the unpaid content publishers provide portions of their webpages for paid content—e.g., advertisements. The paid content is referred to as such because the unpaid content publisher is unrelated to the paid content, except for the monetary benefit of publishing paid content.

In an example, a publisher of an electronic newspaper that provides news to consumers may charge their uses a subscription fee to reading their content. The news content is unpaid content and the publisher of the electronic newspaper is an unpaid content publisher or provider. The publisher of the electronic newspaper may, however, provide content slots or spaces for one or more paid content providers to publish their paid content. Such paid content may be an advertisement or an opinion. In such implementations, the publisher of the electronic newspaper allowing the paid content are the sellers and the paid content providers who provide the paid content are the buyers. As such, publishers own or control the electronic content real estate to the extent that they can offer to include paid content to an unrelated party functioning as a paid content publisher. The paid content publisher pay, by the above described bidding process, to have their paid content inserted into the unpaid content publisher's electronic content real estate.

Embodiments provide a variety of advantages over conventional approaches to providing paid content. The systems and methods herein are embodied in at least computer software to resolve a computer specific problem where generic hardware is agnostic to data and its particular use in bidding for electronic content real estate. Such a computer-specific problem also causes a high level of uncertainty in utilization of electronic content real estate for buyers and sellers. For example, the use of a bidding process, in vacuum and without context, to secure the electronic content slots is ineffective, random, and unrealistic. The computer software described herein, in an example, configures a computer for using a set of rules to evaluate simulated traffic patterns associated with simulated bidding traffic of simulated content campaigns. The evaluation process generates intermediate data of weighted bid traffic. The weighted bid traffic is applied to manipulate content campaign parameters and provides qualified bid requests for use in real time bidding. For example, the qualified bid requests are used to secure electronic content slots in a manner predicted by the simulated bidding process. This allows a computer to accurately recognize and provide content campaign parameters ripe for updates in the real time bidding process and allows for placing winning bids that is a process that removes conjecture from the process.

The systems and methods described here are not mere automation as they include at least the set of rules that are evaluated with simulated traffic patterns to define, in an accurate manner than conjecture, the expectations in real time bidding for a content campaign run through the simulated bidding or bidding engines that are tested in a simulated bidding environment and that may be moved to the real time environment on successful testing. The effect of the set of rules is to create weighting bid traffic, for various time periods, which are most beneficial to the content campaign parameters. In processes that do not include such set of rules, it would be complex to capture the effect of real time bidding traffic on defined content campaign parameters. As such, provided herein is a determination of weighted bid traffic for subsequent use to provide qualified bid requests. The real time bidding traffic may be competitive enough that, for a content campaign, no bids are won and so no content is actually posted and the content campaign remains ineffective. Alternatively, bids may be won at inopportune time slots and may not target intended content consumers resulting in an exhausted content campaign budget that provides no actual and tenable results.

Various other functions and advantages are described and suggested below as may be provided in accordance with the various embodiments.

FIG. 1A illustrates a browser window 100 with a website 102 representing the electronic content real estate in which unpaid and paid content resides. In the example website 102, the unpaid provider is an online shopping service provider which displays various merchandize for sale in section 104 of the website 102. This unpaid provider is the seller, in this example, and provides electronic content real estate (represented as slots 106) for paid content. The paid content 106 may be added after the website 102 is published and may dynamically change based on a user's browsing habits. A paid provider of the paid content 106 is the buyer in this example. Pertinently, the paid provider pays the unpaid provider (or publisher), via a bidding process, to win the right to place paid content on the website 102. In an implementation, a third party web services provider who is unrelated to either the buyer or seller provider functions as a content exchange or a bidding exchange to interface between the buyer and the seller. As such, the content exchange or the bidding exchange may be a web service for electronic bidding between the buyer and the seller. In the example of FIG. 1A, the paid provider is assumed to be the highest bidder because the paid provider has secured the right to place paid content on the website 102.

The website 102 may be part of a domain or an independent website hosted by the domain. The website 102 may be owned or operated by an electronic or online store that provides its own content 104 relating to products available for sale from the electronic or online store. Alternatively, the website 102 may be a product aggregator, securing unpaid content from different websites, but may also provide room for paid content. In an example implementation, the website 102 may be an electronic news website, a services website, a search website, or any other content website. Webpages are part of the website and may differ, from other webpages, within the website.

In website 102, the electronic content real estate is provided where the unpaid content 106 is displayed in FIG. 1A. The electronic content real estate may include multiple portions in the website 102, and paid providers may participate in bidding for one or more of the portions. In FIG. 1A the multiple portions are illustrated as separations or slots 106 in the website 102. The illustrated paid content in slots 106 may be advertisements related to the unpaid content in section 104 provided by the unpaid provider. In the example of FIG. 1A, the unpaid provider (a publisher or owner) of the website 102 may track its users or consumers using cookies, logging information, or monitoring scripts. Such cookies, logging information, or monitoring scripts may be provided from a server of the publisher or the owner to a client device rendering the website 102. When rendered, the website 102 stores the cookies, logging information, or monitoring scripts in a local temporary cache or persistent storage of the client device. The cookies, logging information, or monitoring scripts function to transmit, back to the server, certain information representing browsing or usage information for the client device and the browser.

Periodically, or when requester or permitted, the website 102 may include operational scripts to transmit portions of the cookies or logged information to the server of the publisher or owner. Alternatively, if a callback function is defined, then the operational scripts may provide the cookies or the logged information to one or more unrelated parties via a network or internet connection. The cookies or the logged information is useful for paid content providers because it allows the paid content providers to place targeted content intimate to the users into webpages that the user is browsing. The users are more likely to interact with this content than random paid content. When such content is advertisements, the users are likely to make a purchase by interacting with the content. Accordingly, browsing habits of one or more users of the client device, the browser, and certain websites, as well as certain configuration aspects of the client device are provider to a server to enable targeted paid content. The tracking information may extend beyond the website 102 to other websites browsed on the same client device or the same browser. In an implementation, the configuration aspects of the client device may include a type of the browser, a type of operating system of the client device, an internet connection service provider for the client device, and other related information.

In an exemplary aspect, when website 102 includes advertisement slots 106 for paid publishers' content, the advertisements may be related to the website owner's content 104 or the search request in search area 108. Alternatively, the advertisements 106 are related to browsing habits of a user or consumer of the website owner's content 104. As illustrated in FIG. 1A, when the search request in search area 108 is for a laptop computer, the website owner's unpaid content 104 is associated search results that are responsive to the search request. Scripts, as previously described, track the search requests and/or other user/consumer information and provide this to an advertiser server. The advertiser server or a third party server then provides advertisements (as paid content) associated with the search requests and/or other user/consumer information for publishing in the slots for paid publisher's content 106.

When the paid publishers' content 106 are advertisements, then one or more of the advertisements may correspond to a single advertising campaign. An advertising campaign may target a single product or brand for marketing, but may include different advertisements to the accessories of the product or of the brand. In an example, one advertisement of the advertising campaign may offer a coupon, while another may indicate features of the accessories for the product. In another implementation, advertisements from a single advertiser server may correspond to one advertisement campaign. In other aspects of this disclosure, multiple advertisements are available for multiple advertising campaigns from a single advertiser server or from multiple advertiser servers.

Figure 1B:
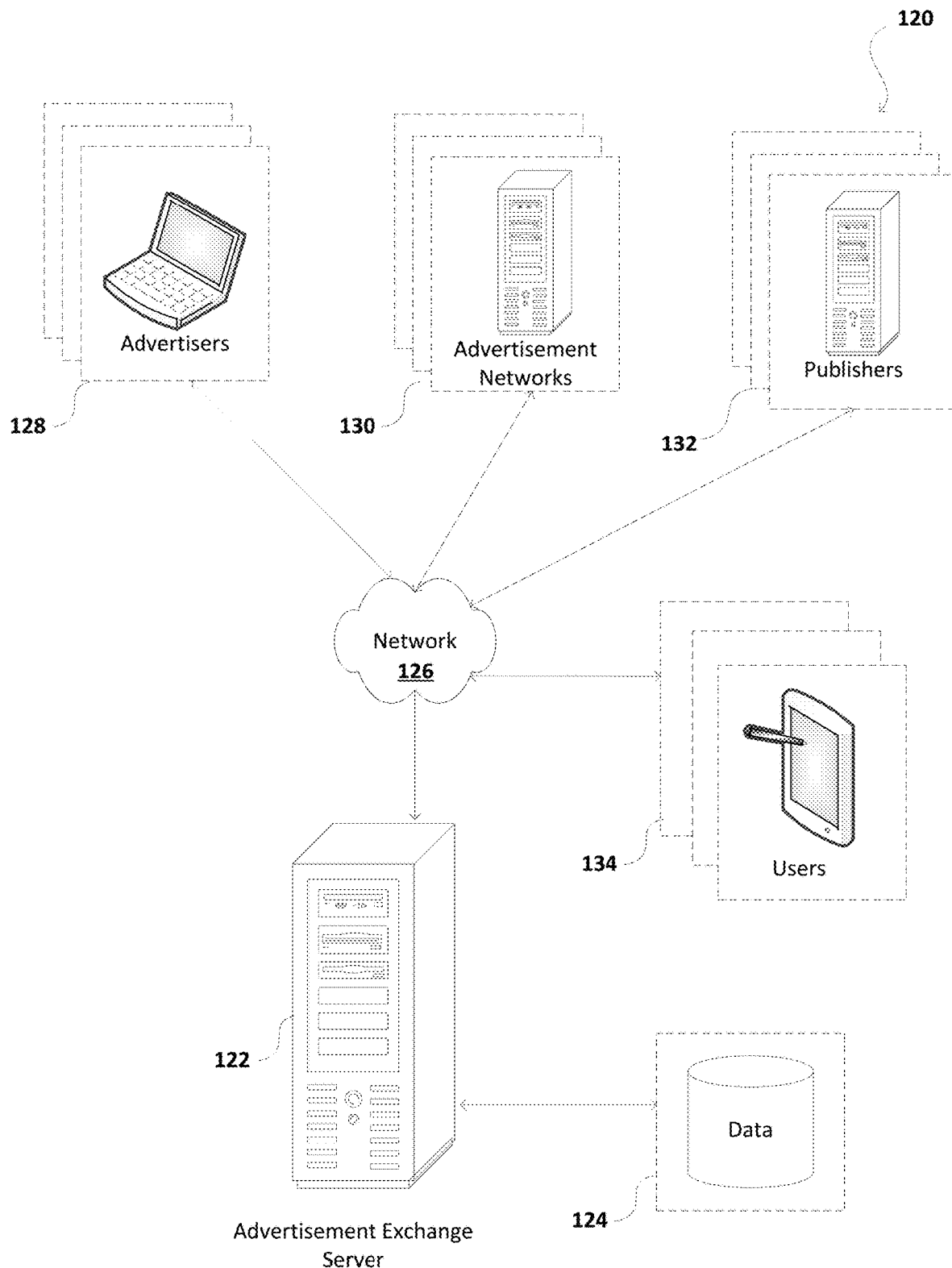
FIG. 1B illustrates an example environment for paid content publishing, when the content is advertisement content, in accordance with an example aspect of the disclosure herein.

FIG. 1B illustrates an example environment 120 for paid content publishing, when the content is advertisements, in accordance with various embodiments. The example environment 120 illustrates example computing components and network relationships that are applicable for providing the paid and the unpaid content in the website 102 of FIG. 1A. The example environment 120 includes an exchange server for content and/or bidding (e.g., an ad exchange) 122, advertisers (paid content providers) 128, advertisement networks 130 (also referred to herein as ad networks), unpaid content publishers (e.g., websites) 132, and users with computing devices 134 that are applicable for accessing the paid and the unpaid content.

Advertisers 128, ad networks 130, and unpaid content publishers 132 are able to utilize respective computing systems and/or devices to interact with the ad exchange 122 through the network 126, for example, a local area network (LAN) or wide area network (WAN), e.g., the Internet. Similarly, users with computing devices 134 are able to utilize their respective computing device to access content (e.g., websites) that may be offered through the unpaid content publishers 132 over the network 126. Such publishers 132 can provide content (e.g., webpages, etc.) that is accessible over the network 126 (e.g., the Internet). For example, an unpaid content publisher 132 may utilize one or more computing systems to provide a website that is accessible through the network 126. The unpaid content publisher's website may offer opportunities to present additional, and typically, paid content to users accessing the website; for example, in the form of electronic advertisements. The computing devices and/or systems for each of the ad exchange 122, advertisers 128, ad networks 130, unpaid content publishers 132, and users with computing devices 134 will each generally include memory for storing instructions and data 124, and at least one processor for executing the stored instructions.

Typically, when a user with a computing device 134 uses the computing device to access content from the unpaid content publisher 132, the unpaid content publisher's system can send, to the ad exchange 122, a request for paid content—such as an advertisement—to be presented with the unpaid content being accessed by the user. This request can include various information about the paid content publisher 132 (e.g., type of content being provided, etc.), the user with the computing device 134 (e.g., gender, age group, interests, etc.), and/or other contextual information (e.g., any search terms in a query submitted by the user, etc.). Typically, the ad exchange 122 can facilitate an electronic auction among the advertisers 128 and/or ad networks 130 to automatically determine which advertisement should be provided to the unpaid content publisher's system in response to the advertisement request. Such an auction can generally be performed automatically using various constraints (e.g., maximum bids) specified by the advertisers 128 and/or ad networks 130 and the highest bidder is typically deemed the winner of the auction. In various embodiments, various constraints, objectives, or requirements may be defined by a bidder. In an example first objective, a bidder may be obligated to train a ranking model to determine a relevant subset of ads from a larger group of ads. In one embodiment, a relevant ad can be an ad that will likely (e.g., at least to a threshold confidence value) result in a selection or "click" of that ad. In an example second objective, the bidder may be obligated to accurately estimate the probability of a particular advertisement being selected when displayed and the probability of a purchase of an item represented by the particular advertisement. Once the auction is complete, the winning advertisement is provided to the unpaid content publisher's system 132 in response to the advertisement request to be displayed, as an impression, with the unpaid content publisher's content—such as on website 102 of FIG. 1A. The unpaid content publisher's system 132 can then provide the advertisement together with the unpaid content being browsed by the user with the computing device 134. Various payment approaches may be utilized to pay the unpaid content publisher for the space to provide the paid content, noting that the payment may not be for content but for the space and right to place paid content on the unpaid content publisher's website. For example, a portion of the bid price can be paid to the unpaid content publisher per impression (i.e., cost per impression or cost per mille), per click (i.e., cost per click), per conversion, etc.

Figure 2:
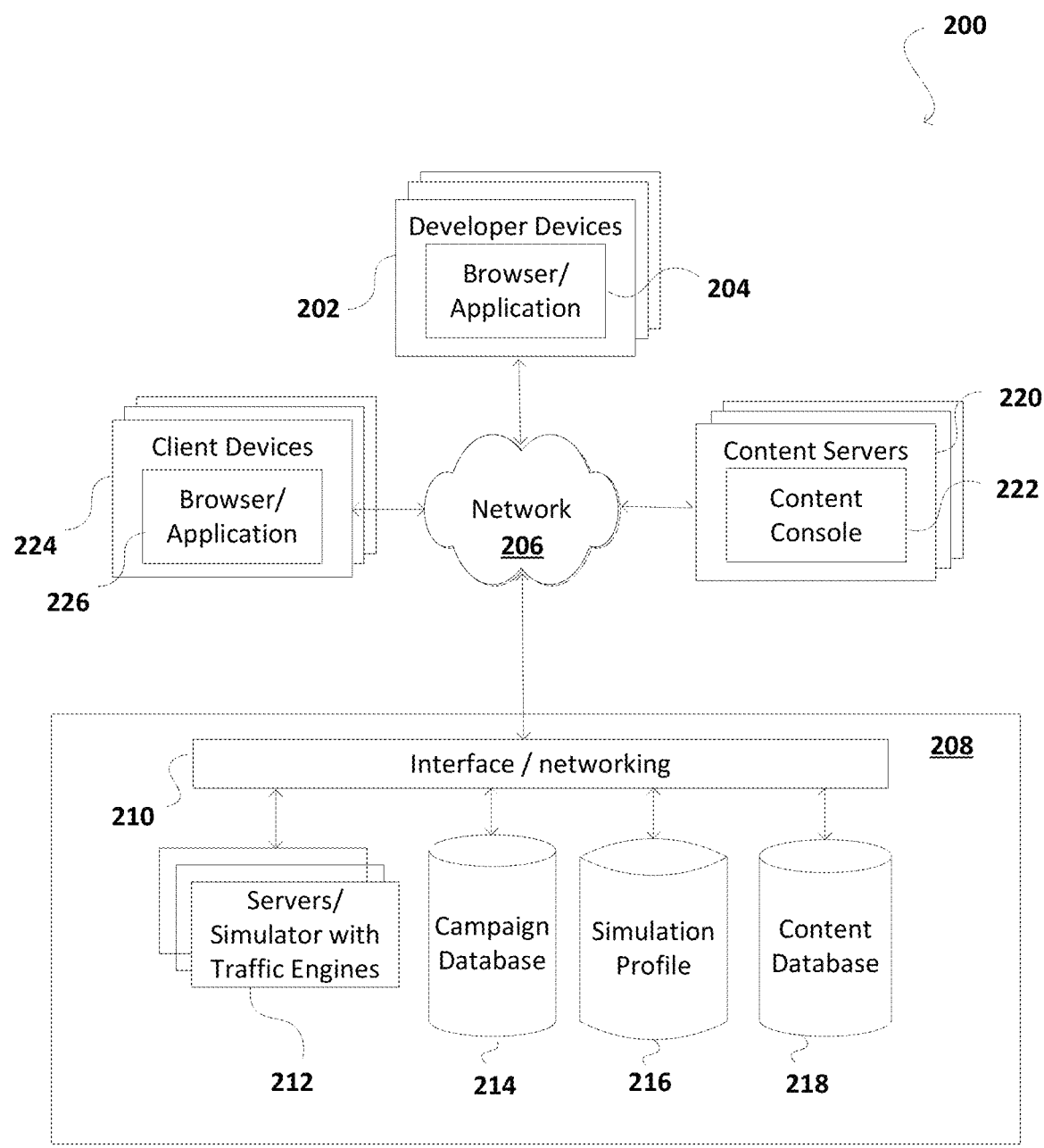
FIG. 2 illustrates an example system architecture for simulated and real time bidding in accordance with various embodiments.

FIG. 2 illustrates an example system architecture 200 for simulated and real time bidding in accordance with various embodiments. The system architecture 200 includes developer devices 202 in communication with content servers 220, with client devices 224, and with server device 208, via network 206. Client devices 224 and developer devices 202 can include any processor and memory based electronic devices with capabilities as disclosed herein, but at least with the capability to execute computer-readable instructions for a browser and to execute the previously mentioned scripts with or without a browser. These electronic devices are described in detail below and include specific configuration to perform the functions herein. Such electronic devices may include personal computers, tablets, ultrabooks, smartphones, cell phones, wearable watches and related devices, handheld messaging devices, laptop computers, set-top boxes, personal data assistants, electronic book readers and the like. Each of these electronics devices may be configured to include a browser or a stand-alone application 204/226 that is capable of being configured in the manner of this disclosure. In an implementation, developers use the developer devices 202 to run tests on hardware and software features or services offered in the system architecture 200. User or consumers of electronic or online products and/or services use the client devices 224 to interface with a website providing content.

The network 206 can include any appropriate network, including an intranet, the internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such system architecture 200 can depend at least in part upon the type of network and/or environment selected. Protocols and components for communicating via such a network are well known and will not be discussed herein in detail. Communication over the network 206 can be enabled via wired or wireless connections and combinations thereof. In this example, the server device 208 may include one or more local servers in communication with each other and with other remote servers via the network 206. In an example, the server device 208 includes a web server for receiving requests and serving content from the client devices 224, the developer devices 202, or the content servers 220. In response thereto, although for other networks, an alternative device serving a similar purpose as any one of the server device 208 could be used, as would be apparent to one of ordinary skill in the art upon reading this disclosure.

The system architecture 200 may be applicable to both, simulated and real time bidding. In an example, simulated bidding occurs via servers or modules 212-218. The servers or modules 212-218 may be one or more servers, one or more databases, or one or more connected hardware and software components. The servers/simulator with traffic engines 212 may incorporate a distributor relationship with other servers within the server device 208 or outside the server device 208. For example, the traffic engines 212 may function with the content servers 220 to provide simulated content campaign or real time content campaigns. When the content is advertisement content, advertisement campaigns or real time advertisement campaigns are provided from the content servers 220. Campaign database 214 stores information relating to the content (e.g., advertising) campaigns, while the simulation profile database 216 stores information relating to the developers using developer devices 202. In an example, the information relating to the developers may include developer scripts, test codes, test parameters, and other features used to test content campaigns via simulator 212. Content database 218 is available to provide simulated or stored sponsor content (e.g., advertising), if the simulation is fully maintained within the server device 208.

In a further example, the content server 220 may include a content console 222 for communicating with the server device 208. The content console may be an internet-enabled application that is configured to execute on the content server 220 and is configured to communicate with the server device 208 in the manner described herein. The communications between the server device 208 and the servers/devices of FIG. 2 is via an interface or networking component 210, such as a network interface card or a wireless interface. In alternate embodiments, the system architecture 200 is maintained internal and confidential to a simulator environment. Accordingly, one or more components or modules in the system architecture 200 are isolated from external influence by any known security methods, including firewalls. In accordance with such an implementation, one or more components or modules in system architecture 200 may be virtual machines or operate in a virtual environment for simulation of bidding traffic and related processes.

Figure 3:
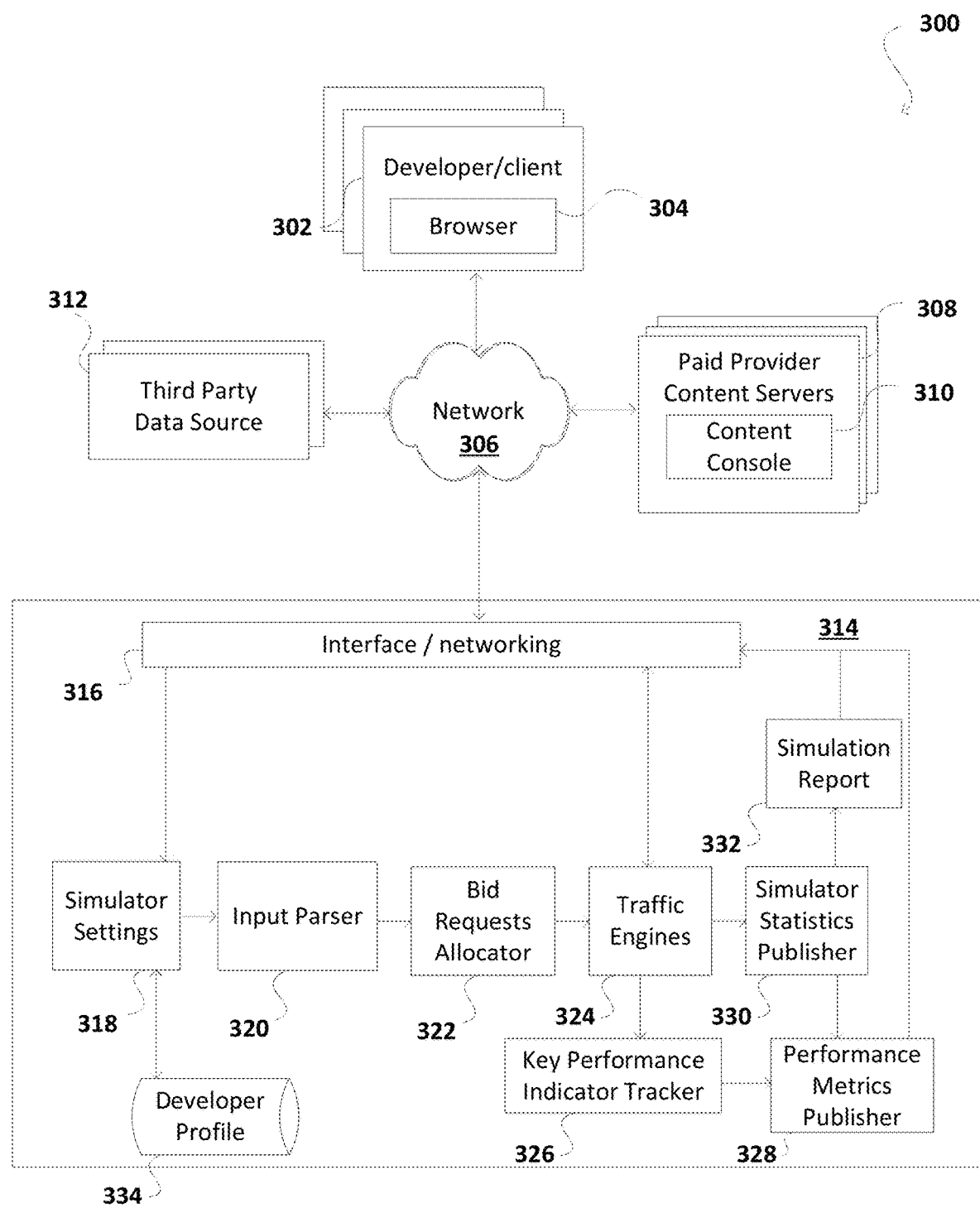
FIG. 3 illustrates another example system architecture with details of example simulator components and interconnections in accordance with various embodiments.

FIG. 3 illustrates another example system architecture 300 with added details for the example simulator components and interconnections in module 314, in accordance with various embodiments. Modules as used herein may be software, hardware, or a combination of hardware and software that are each configured to perform computer specific function as described herein. Pertinently, as with the example system architecture 200 of FIG. 2, the module 314 includes one or more severs, software and hardware components, and/or virtual machines. In system architecture 300, a server device 314, similar or distinct from the server device 208, provides substantially all the components for bidding simulation. Such components may include the simulator settings component 318, input parser 320, bid requests allocator 322, traffic engines 324, key performance indicator (KPI) tracker 326, performance metric publisher 328, simulator statistics publisher 330, simulation report module 332, and interface or network component 316. As in the case of system architecture 200, the system architecture 300 of FIG. 3 illustrates that the server device 314 communicates with third party data sources 312, developer/client device 302, and with paid provider servers 308. Each of the third part data source 312 and the developer/client devices 302 may rely on browsers or stand-alone applications 304 for its communication. Content console 310 allows the paid provider content servers 308 to communicate with the server device 314.

In terms of functionality, developers or clients may communicate with the components of server device 314 using a character user interface (CUI), including a command-line interface of a web-enabled application, or a graphical user interface (GUI). Developers, via the developer or client devices 302 communicate with the server device 314 to create or update campaign management data (CMD), delivery state, and bidding traffic patterns for one or more content campaigns. The campaign management data (CMD) may include a set of rules that define an individual content campaign in the simulator environment. For example, if a developer wishes to test an individual content campaign that includes a campaign budget for a certain traffic pattern, the developer would be able to do so in the simulated environment. The developer would also be able to make updates to related content campaign parameters and would be able to secure intermediate data generated from the simulation environment for providing qualified bid requests that are applicable in real time bidding. The delivery state may define status of any offset to the start of a simulated content campaign and of the budget spent. The bidding traffic patterns may include information such as: volume of bids per hour; types of traffic—e.g., bid request type, impression request type, or a delivery update; composition of the bid traffic patterns—e.g., defined as a percentage of the total or amounts of each type of bid; target of the bid requests—e.g., behavior segments; and the simulated winning bid. The bid request or bid may include any type of bids, including impressions (when the content is displayed advertisements) or interactions (selected advertisements from displayed advertisements).

In the example system architecture 300, the developer creates and stores content campaigns as models in a database, such as the simulation profile database 334. Such content campaigns are persistently stored and may be updated for different testing schemes using different traffic patterns, in one example. A variation of the content campaigns may be created and stored in a different section of the database 334 for real time use. Accordingly, the database 334 may support a simulator section and a real time section. Tests conducted for certain content campaigns in the simulator section may be the basis to identify qualified bid requests that may be attained using adopted settings from the simulator section to corresponding content campaigns of the real time section. A content campaign, of either the simulator or the real time section, may include, as part of the CMD, flight time—the time designated for running the content campaign—and a corresponding campaign budget. There may also be associated line items in the CMD, such as: a type of the content campaign, a target string of terms with which the content is associated, and a pacing time associated with how often to bid or display content relating to the content campaign.

Once a content campaign is defined using the above processes of defining a CMD and any associated line items, a traffic pattern for bidding is determined for the simulator to evaluate with the set of rules defining bidding engines in the CMD. The traffic pattern may be based off of real time traffic patterns from bidding traffic on special holidays, new product introduction, discounts, etc. For example, when the content campaign is for an advertisement campaign, the traffic pattern may be designed to consider traffic for bidding during certain holidays when advertisements are placed more frequently than at any regular time. The electronic content real estate is in demand during such time and bids are also at higher values. To test the advertisement campaign against other advertisement campaigns during a particular season, any prior bid traffic information may be used to define the traffic pattern for the simulator tests.

After the simulator settings component 318 receives the simulator inputs, including the bidding engine (i.e., set of rules) and the traffic pattern, the simulator settings component 318 provides these inputs to the input parser 320. The input parser provides the simulated traffic pattern to the traffic engines 324 and the set of rules to the bid requests allocator 322. The traffic engines 324 and the bid requests allocator 322 work to evaluate the simulated traffic pattern against the set of rules for one or more content campaigns, and generates intermediate data of weighted bid traffic for multiple periods of time as defined in the simulated traffic pattern and based on the evaluation using the set of rules. Qualified bid requests are provided from the intermediate data, where the qualified bid requests are associated with the weighted bid traffic and with updates to one of the parameters or simulated values relating to the set of rules. Such updates may be predetermined updates, for example, such as updates that are applicable to change the simulated bid requests, simulated interactions, and simulated first time periods as the simulation progresses. As such, the set of rules in each bidding engine are a function of the simulated bid requests, the simulated interactions, and the simulated first time periods as the simulation progresses for that bidding engine. For example, changes to any of these parameters for the simulation affect the set of rules for the simulation. Alternatively, such predetermined updates occur on repeating or restarting the simulation. After the simulation completes, the number of winning bids are determined and evaluated to apply one of the qualified bids requests to a real time bidding process.

In an example, a qualified bid request that has the highest number of winning bids is provided to content servers in real time bidding to secure content slots for displaying content associated with a real time content campaign that corresponds to the simulated content campaign. When the content campaign is an advertisement campaign, then one or more winning bids from the qualified bid requests in the simulation are provided to a real time bidding process, occurring via a content server (e.g., paid provider content servers 308) or a bid exchange server, and are most likely to be winning bids in the real time bidding process. The winning bids typically correspond to campaigns for which the budget is exhausted upon completion of the simulation. In an alternative embodiment, the set of rules (i.e., bidding engine) leading to the exhausted campaign is then provided as a real time campaign for a securing content slots for real time advertising. For purposes of this disclosure, the content server may include the bid exchange server, or these may be separate, but the winning bid at least secures content slots, from one or more servers, for displaying content associated with the real time content campaign.

The input parser 320 is provided in server device 314 for parsing simulated bid requests from the simulator settings component 318 to a bid requests allocator 322. The bid requests allocator 322 allocates simulated bid requests to one or more traffic engines 324. In an example, the one or more traffic engines 324 may be used to simulate traffic patterns to one or more bid exchanges, which host bid exchange servers and which evaluate bid requests in the traffic patterns against demand simulations to each of the bid exchanges. The evaluation, in an example, seeks to balance the highest bids in any given time period to the willing demand for that time period. The willing demand is representative of what a website's owner is willing to accept to provide content slots for a bid requester. In one example, if the website's owner (as a seller) has less demand for content slots, the website's owner will be willing to take whatever bid is posted to the bid exchange by at least one buyer within a defined time limit. However, when demand for the content slots increase, the website's owner (as the seller) may seeks best bid requests from multiple buyers, based on length of time for content display and bid value of the bid requests from the multiple buyers. The website's owner (sellers) may seek the best balance of the length for content display and the bid, while the paid providers (buyers), functioning as bidders, would seek the best times of the day for displaying content and the most prominent of the content slots based on location on the website. The bid exchange functions to find optimal conditions that are satisfactory for the buyers and the sellers and to determine qualified bid requests.

In an aspect, the website owner may set minimum bid value targets for content slots so that the bid value of the bid request has to exceed the minimum bid value targets for participation in the bidding process or to be able to place content on the website owner's webpages. The bid exchange may, in an alternate implementation, restrict bids in accordance with various requirements, including minimum bid value targets, length of content placement time, number of content slots subject to the bid request, and other related requirements. Paid providers or bidders intending to participate in the bid exchange may need to meet one or more of the requirements. In an example of the optimal conditions that may occur for qualified bid requests, one or more of the following conditions may be required for bid values to belong to qualified bid requests: a highest bid value in a period of time for a content slot, a highest combined value of a bid value per content placement length of time and the content placement length of time, and a highest increasing bid value over a content placement length of time. The decision to identify bid requests that meet one or more of the optimal conditions as qualified bid requests is made on the basis of the simulation to provide the weighted bid traffic and any predetermined updates made to at least one parameter of the content campaign. For example, based on the simulation and the number of successful (or unsuccessful bid requests), bid values may be changed or placement length of time may be changed in a manner to increase the success rate of bid requests. Once bid requests are successful using the predetermined changes, the successful bid requests are basis for real time bidding for content.

In an implementation, a proxy functions for each of the websites' owners and for the paid providers. The proxy may be a proxy server or a component of the bid exchange servers. The proxy may function for multiple buyers and sellers. Accordingly, the proxy may combine electronic content real estate for multiples sellers and offer a simple demand value that demonstrates economies of scale. The paid content provider (buyer) may then provide bids for displaying content across one or more of the related websites to the proxy.

Once a simulation is complete, the key performance indicator (KPI) tracker module 326 collects or determines KPI values from the simulation. Such KPI values are applicable to allow further predetermined changes to be implemented to one or more parameters of the content campaign. Alternatively, the KPI values may be collected during the simulation to allow for the predetermined changes to be implemented, during the simulation, to the one or more parameters of the content campaign. The KPI tracker module 326 provides its values to the performance metrics publisher 328, which in turn provides reporting of performance metrics, by formatting raw statistical values from the simulator statistics publisher module 330 and simulation report module 332. Modules 326-332 allows for remote access to reporting information during or after the simulation. Such modules 326-332 enable predetermined updates to be made to the simulation during its process or in a subsequent simulation process. In an example, developer/client devices 302 may access the simulator module 318 and the simulation report and related modules 326-332.

The system of FIG. 3, using the above performance modules 326-332, are also available to monitor performance parameters during performance of the individual content campaign in real time. A parallel simulation may be updated by adjusting at least one of the set of rules for one of: the simulated bid requests (also referred to as base bid amount), the simulated interactions, and the simulated first time periods for the individual advertising content. In another example, monitoring the performance parameters during performance of the individual content campaign also allows the system of FIG. 3, using the simulator 318, to determine changes to the set of rules in accordance with a difference between actual interactions and the simulated interactions.

Advertiser servers 308 may function with the simulator, via segregated accounts, for example, to maintain a separation from real time processes and simulated processes. The advertiser servers 308 may provide advertisements for testing with the simulator 318, which relies on simulated traffic patterns and the set of rules defined either by the advertiser servers 308. In an example, the advertiser servers 308 provide, for test in the simulator, individual content campaign in the form of an associated advertisement uniform resource locators (URLs) and associated advertisement budgets. The system herein, using at least the simulator 318 and the parser 320, determines the set of rules, including the simulated bid requests, the simulated interactions, and the simulated traffic time periods, based at least in part from the advertisement budgets. Advertisement consoles 310 are provided in the advertiser servers 308 to communicate with the server device 314. Further, third party data sources 312 representing one or more servers may communicate with the server device 314 to access the simulator 318 or the simulation reports via modules 326-332. Each of the remote or local servers or devices 302, 308, and 312, communicate with the server device 314 via network 306.

The illustrative system architecture 300 includes at least one application (or product) server in the device server 314, which has one or more corresponding data store or databases, e.g., database 334. As used herein, data store or database refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling the simulator and other components 316-332 in the server device 314. The application server may provide access control services in cooperation with the data store and is able to generate content such as text, graphics, audio and/or video to be transferred to the user, which may be served to the user by the Web server in the form of hypertext markup language (HTML), extensible markup language (XML), or another appropriate structured language in this example. It should be understood that the web and application servers are not required and are merely example components, as structured code discussed herein can be executed on any appropriate device or host machine as discussed elsewhere herein.

Where multiple servers form part of the device server 314, each server typically includes an operating system that provides executable program instructions for the general administration and operation of that server and typically will include computer-readable medium storing instructions that, when executed by a processor of the server, allow the server to perform its intended functions as described herein. Suitable implementations for the operating system and general functionality of the servers are understood upon reading this disclosure. Additionally, commercially available hardware and software is modified by the configuration discussed with respect to the set of rules and the traffic patterns, which are specific to the disclosure herein. Suitable implementations for the operating system and general functionality of each server in the device server 314 may be in an environment that is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 3.

In an example implementation, the system architecture 300 includes servers, hosts, instances, routers, switches, databases, other similar components, or a combination thereof. These resources are not limited to storing and providing access to the simulator and related data. Indeed, there may be several product servers, layers, or other elements, processes, or components, which may be chained or otherwise configured, and which can interact to perform tasks including, for example, obtaining data from an appropriate database. As used in this specification, database also refers to any device or combination of devices capable of storing, accessing, and retrieving data, which may include any combination and number of data servers, databases, data storage devices, and data storage media, in any standard, distributed, or clustered environment. The databases can include several separate data tables, databases, or other data storage mechanisms and media for storing data relating to a particular aspect.

Figure 4:
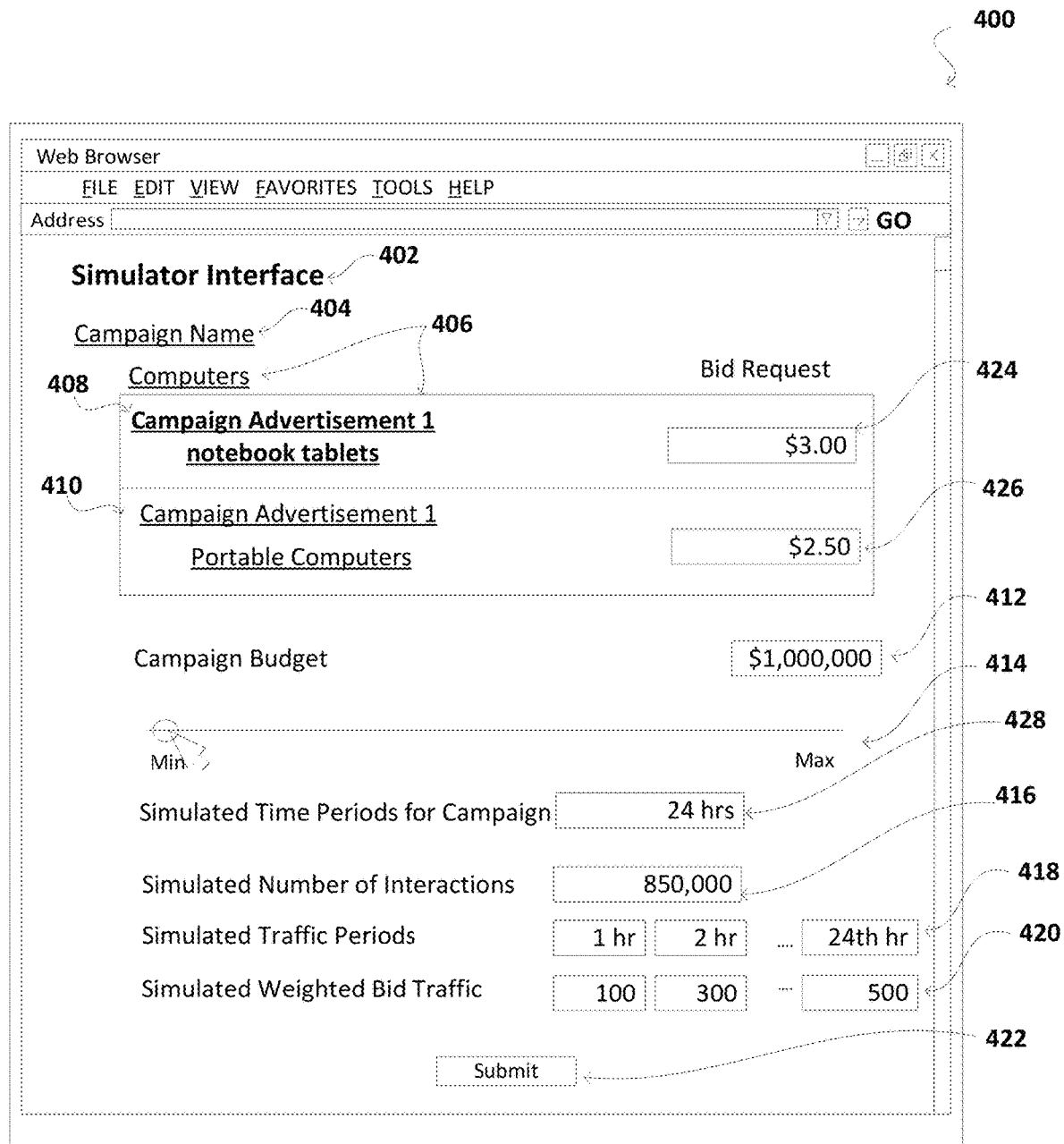
FIG. 4 illustrates an example dynamic user interface for providing the real time bidding simulation in accordance with various embodiments.

FIG. 4 illustrates an example dynamic user interface of a browser 400 for providing the real time bidding simulation for paid content in accordance with various embodiments. While FIG. 4 relates to advertisement content, a person of ordinary skill would recognize from the present disclosure that any paid content is applicable in a similar manner as described in this example. The dynamic user interface 402 is a simulator interface including multiple dynamic or user-entered fields. The dynamic user interface 402 functions within the browser 400, but may be a stand-alone application, in an alternate implementation. The dynamic user interface 402 allows developers/clients to prepare content campaigns. Each content campaign may target a specific product, service, or intent, for example, with individual content from the content campaign targeting sub-portions of the product, the service, or the intent. In an example, when the content pertains to advertisements for a brand promoted by one or more paid providers, then the content campaign 404 is a campaign 406 with a provided campaign name for multiple advertisements 408 and 410 that are defined for targeting different products (e.g., notebook tablets and portable computers) of the brand.

A set of rules is then assigned for the content campaign 404, including at least a simulated campaign budget 412, which is adjustable, in an example, by a sliding scale 414; a simulated number of interactions (impressions, clicks, or cursor hovering over a displayed content) 416; a simulated number of time periods for the content to be displayed 428, and simulated bid requests (or base bid amounts) 424 and 426. The simulated number of time periods is illustrated as 24 hours in field 428 of the dynamic user interface 402, but entries in the form of seconds, minutes, days, or even portions of a day and an hour are applicable in the dynamic user interface 402.

Simulated traffic patterns may be defined in the interface 402 or via a traffic file provided to the simulator. For example, the simulated traffic is provided as traffic file including time 418 (simulated traffic periods) and weight distribution corresponding to simulated bidding traffic from different simulated content bidders. Such a traffic file may be provided as: {0:1, 1:1, 2:1, 3:1, 4:1, 5:1, 6:2, 7:2, 8:1, 9:1, 10:1, 11:1, 12:2, 13:4, 14:4, 15:4, 16:4, 17:2, 18:1, 19:2, 20:4, 21:4, 22:4, 23:1}. Each value combination in the above example is in the format of: hour:weight. For example, 0:1 is a zero hour:weight one, while 1:1 is first hour:weight one, etc. The traffic file may also include a traffic volume—e.g., 100 million. When the simulator is set to recognize a simulated number of time periods for a content campaign (e.g., input field 428) as 24 hours, the simulator is configured to dynamically calculate a total traffic weight 50, and is configured to dynamically space the traffic volume in accordance with the weight distribution by dividing the traffic volume of 100 million by 50 weighted sections to provide 2 million traffic volume per weight value.

The set of rules provided in the dynamic user interface 402, however, maybe limited to the campaign budget 412, the bid requests 424 and 426, and the simulated time periods for the campaign 428—but not providing the simulated number of interactions, as in field 416. The simulator is capable of simulating the bid requests to transact with the bid demand, using the traffic pattern, and is capable of providing the simulated number of interactions in field 416, in a dynamic manner, such that the simulated campaign budget in field 412 is exhausted.

Alternatively, in an implementation, when the number of interactions in field 416 is defined in the simulation, without the bid request values 424 and 426, then the simulation may provide simulated bid request values 424 and 426 for exhausting the campaign budget 412 in the simulated number of time periods of the campaign 428. Such processes demonstrate the dynamic nature of the user interface 402, which is capable of providing values during simulation time, as the simulated campaign budget 412 is spent to transact the simulated bid requests 424 and 426 with the traffic pattern.

In a further implementation, the simulated traffic periods 418 and the simulated bid requests 420 are calculated, as part of the simulator process, and using the traffic file information. For example, using the set of rules and the traffic pattern previously noted, weighted bid traffic is calculated as 2 million bids per weight per traffic period—that is 12 time periods at a weight of 1 (or 24 million bid requests), 5 time periods at a weight of 2 (20 million bid requests), and 7 time periods at a weight of 4 (56 million bid requests). The total in this example simulation would provide the input requirement traffic volume of 100 million bid requests that is distributed, as per the traffic pattern, in 24 periods of time (e.g., based on the evaluation of the 24 hours requirement in the set of rules for the content campaign as a parameter in field 428 of the dynamic user interface 402). The submit button 422 provides the dynamic user interface 402 with a start simulation indicator. A person of ordinary skill, on reading this disclosure and recognizing the dynamic user interface aspects, would recognize that the dynamic user interface 402 may utilize changes made to any of the fields, during simulation, as an update to change the simulation processes. Alternatively, the changes to the fields in the dynamic user interface 402 may indicate a restart of the simulation with the newly entered values. A message requesting to confirm restart of the simulation maybe provided on the dynamic user interface 402 prior to restarting with the changed values to the fields of the dynamic user interface 402.

Accordingly, using the present system and method, for the individual content campaign 404, intermediate data of weighted bid traffic is generated. In an example, based at least from the above example simulation, the weighted bid traffic may be the determination of time periods and their corresponding bid requests—e.g., 12 time periods of a weight of 1 (24 million bid requests), 5 time periods at a weight of 2 (20 million bid requests), and 7 time periods at a weight of 4 (56 million bid requests). This represents intermediate data for the simulated second time periods (first hour to the twenty fourth hour), based at least in part on evaluating the simulated traffic patterns in the traffic file against the set of rules providing at least bid requests 424 and 426, campaign budget 412, and/or simulated time periods for the campaign 428.

Qualified bid requests are obtained from the intermediate data when the system indicates that the budget is exhausted using the traffic pattern and the set of rules. In the event that a campaign budget is still remaining, the simulator recommends a change to the bid requests the simulated time periods for the campaign, while keeping the traffic pattern consistent as the traffic pattern is intended to be tested by the simulation. Alternatively a change is made in the simulation as a predetermined update to one or more of the simulation values, including the simulated bid requests 424 and 426, simulated number of interactions 416, and simulated first time periods 428. When qualified bid requests are obtained from the intermediate data such that the campaign budget is exhausted, then one or more of the qualified bid requests is sent to content servers for real time bidding. Such a process will secure content slots for displaying content associated with the individual content campaign corresponding to the simulated campaign 404. The qualified bid requests, as provided to the content servers, include one or more of the bid request values from fields 424 and 426, the campaign budget from field 412, the time periods for the campaign from field 428, and the simulated number of interactions 416.

Information for a particular campaign 404, advertisement, or the fields in the dynamic user interface 402 can be viewed in a dedicated page or window of the browser after clicking on each of the fields or titles in the dynamic user interface, for instance. In such an implementation the fields or the titles include hyperlink, clickable, or selectable aspects to allow the relevant information to open in a same application as the image or a separate page or application than the dynamic user interface 402.

Figure 5:
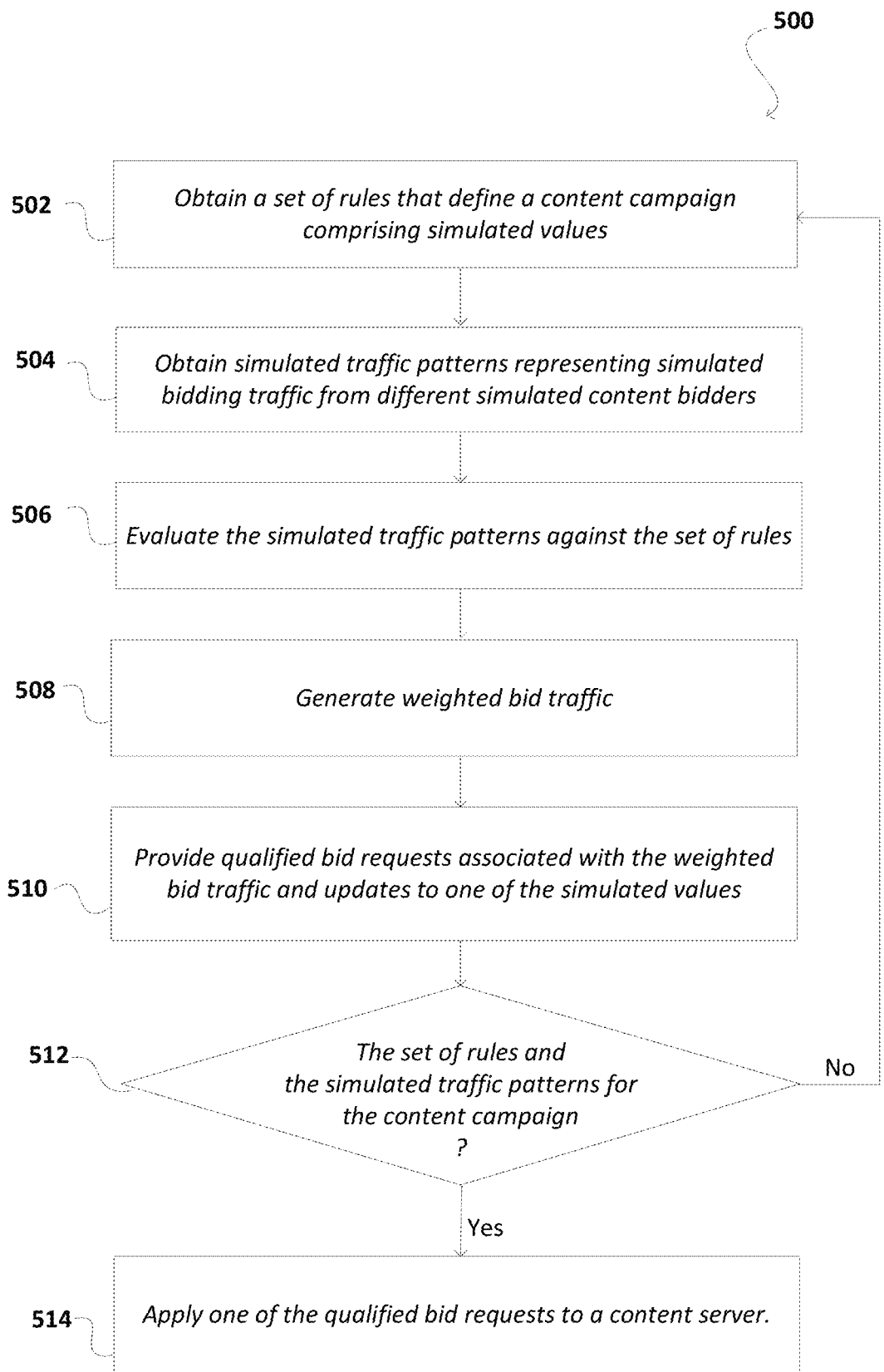
FIG. 5 is a flow diagram of an example process for simulating real time bidding and for applying qualified bids obtained from the simulation in accordance with various embodiments.

FIG. 5 is a flow diagram 500 of an example process for simulating real time bidding and for applying qualified bids obtained from the simulation in accordance with various embodiments. It should be understood that for this and other processes discussed herein that there can be additional, alternative, or fewer steps performed in similar or alternate orders, or at least partially in parallel, within the scope of the various embodiments unless otherwise specifically stated. In this example, the computer-implemented method in FIG. 5 includes a sub-process 502, for obtaining a set of rules that define an individual content campaign. Such a set of rules includes simulated values intended for the individual content campaign. Sub-process 504 illustrates a configuration to one or more computers for obtaining simulated traffic patterns representing simulated bidding traffic from different simulated content bidders. Sub-process 506 provides evaluation of the simulated traffic patterns against the set of rules.

The evaluation sub-process 506 leads to generation of intermediate data of weighted bid traffic in sub-process 508, as described with respect to FIG. 4. The weighted bid traffic corresponds to the individual content campaign. Sub-process 510 enables the configured one or more computers to provide qualified bid requests from the intermediate data. Pertinently, as previously described with respect to FIG. 4, the qualified bid requests are associated with the weighted bid traffic and with predetermined updates to one of the simulated values of the individual content campaign. A decision sub-process 512 enables configuration to the one or more computers for determining that the set of rules and the simulated traffic patterns are for the same individual content campaign. If the set of rules are for a different content campaign, a change may be made by obtaining the relevant set of rules in sub-process 502. Finally, in sub-process 514, when the set of rules and the simulated traffic patterns are for the same individual content campaign, one of the qualified bid requests is applied to one or more content servers to secure paid or sponsored content and content slots for displaying the paid or sponsored content in a pertinent webpage.

Figure 6:
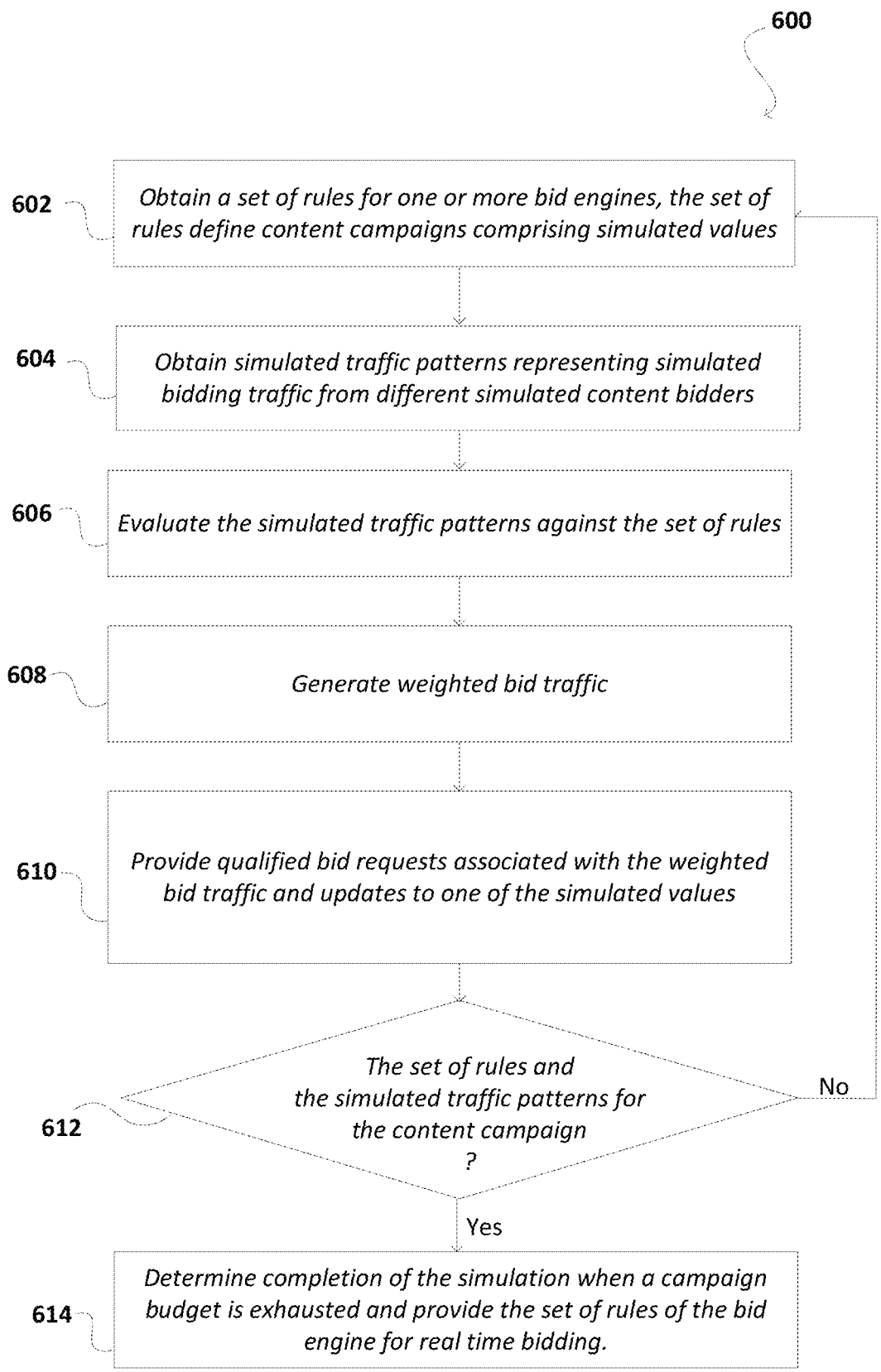
FIG. 6 is a flow diagram of an example process for simulating real time bidding and for applying the set of rules obtained from the simulation in accordance with various embodiments.

FIG. 6 is a flow diagram 600 of an example process for simulating real time bidding and for applying the set of rules from the simulation to real time bidding, in accordance with various embodiments. It should be understood that for this and other processes discussed herein that there can be additional, alternative, or fewer steps performed in similar or alternate orders, or at least partially in parallel, within the scope of the various embodiments unless otherwise specifically stated. In this example, the computer-implemented method in FIG. 6 includes a sub-process 602, for obtaining a set of rules for one or more bidding engines, where the set of rules define content campaigns. Such a set of rules includes simulated values intended individual content campaigns. Sub-process 604 illustrates a software configuration to one or more computers for obtaining simulated traffic patterns representing simulated bidding traffic from different simulated content bidders. Sub-process 606 provides evaluation of the simulated traffic patterns against the set of rules.

The evaluation sub-process 608 leads to generation of intermediate data of weighted bid traffic in sub-process 610, as described with respect to FIG. 4. The weighted bid traffic corresponds to the individual content campaign. Sub-process 610 enables the configured one or more computers to provide qualified bid requests from the intermediate data. Pertinently, as previously described with respect to FIG. 4, the qualified bid requests are associated with the weighted bid traffic and with predetermined updates to one of the simulated values of the individual content campaign. A decision sub-process 612 enables configuration to the one or more computers for determining that the set of rules and the simulated traffic patterns are for the same individual content campaign. If the set of rules are for a different content campaign, a change may be made by obtaining the relevant set of rules in sub-process 602. Finally, in sub-process 614, when the set of rules and the simulated traffic patterns are for the same individual content campaign, a determination is made for completion of the simulated bidding in a successful manner. In an example, the completion of the simulated bidding in the successful manner is when a campaign budget associated with the content campaign is exhausted by the simulated traffic patterns. When such determination is indeed the case—that the simulated bidding is successful, then the set of rules defining a corresponding bidding engine with the exhausted campaign is provided for real time bidding to enable one or more content servers to secure paid or sponsored content for displaying in slots of a pertinent webpage.

Figure 7:
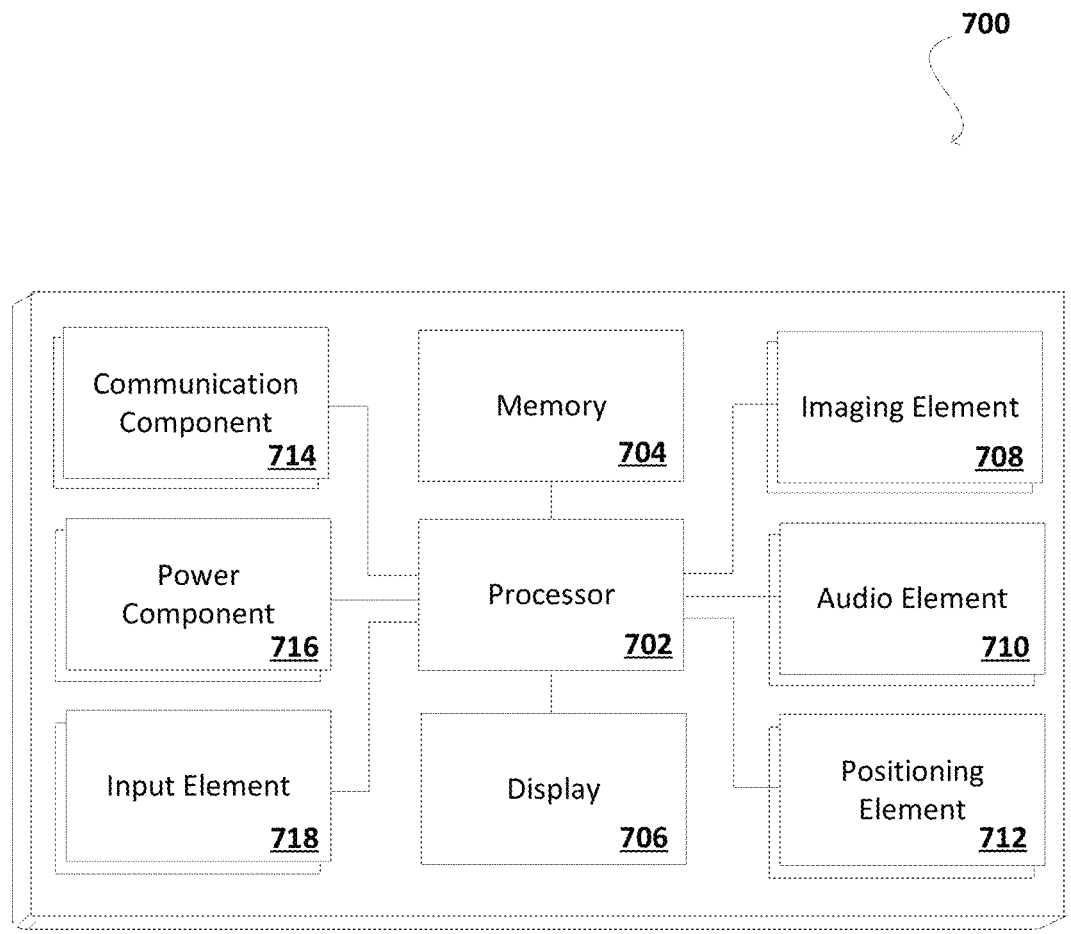
FIG. 7 illustrates an example computing device for performing one or more of the disclosed embodiments.

FIG. 7 illustrates an example configuration of components 702-718 of an example computing device 700, such as developer or client computing devices 202 and 302 illustrated in FIGS. 2 and 3, or the computing devices generally disclosed throughout this disclosure. Components 702-718 are a set of basic components for a computing device, but alternative or different arrangements are applicable for any of the disclosed computing devices in this disclosure, without changing the features in the embodiments above. In the example of FIG. 7, the computing device 700 includes at least one processor 702 for executing instructions that can be stored in a memory device or element 704. As would be apparent to one of ordinary skill in the art, upon reading this disclosure, that the computing device 700 can include many types of memory, data storage or computer-readable media, such as a data storage for program instructions for execution by the processor 702.

The same or separate storage than memory 704 can be used for data and a removable memory can be available for sharing information with other devices. Further, any number of communication approaches can be available for sharing the information with other devices. Furthermore, it would also be apparent to one of ordinary skill, upon reading this disclosure, that processor 702 may be multiple processors, each with processing tasks for the embodiments here, and may collectively act as a processor for the embodiments herein.

The computing device 702 includes at least one type of screen or display element 706, such as a touch screen, electronic ink (e-ink), organic light emitting diode (OLED) or liquid crystal display (LCD), although devices such as portable media players might convey information via other means, such as through audio speakers. The computing device 700, in an example, may also include at least image capture element 708. The image capture element 708 can include any appropriate technology, such as a CCD or CMOS image capture element having a sufficient resolution, focal range and viewable area, to capture an image.

The example computing device 700 additionally includes at least one position sensor 712, such as an accelerometer, digital compass, electronic gyroscope or inertial sensor, which can assist in determining movement or other changes in position or orientation of the device 700. The device 700 can include input elements 718 that are available to receive conventional input from a user. This conventional input can include, for example, radio-communications type wand devices, hand or gesture sensors, a push button, touch pad, touch screen, wheel, joystick, keyboard, mouse, trackball, keypad or any other such device or element whereby a user can input a command to the device. The conventional input, in one example, interfaces with the UI to move pointers or indicators on the UI, as in the case of the finger or stylus. One more of the input elements 718, in an example, are connected to the computing device 700 by a wireless IR or Bluetooth® or other link. In an embodiment, computing device 700 might not include any buttons at all and might be controlled only through a combination of visual and audio commands such that a user can control the computing device without having to be in contact with the computing device.

Furthermore, the computing device 700 includes, in another example, communication component 714 and audio element 710 representing various communication features for the computing device to commute with near and far devices. For example, using Bluetooth®, Wi-Fi®, and other communication protocols. The computing device 700 is powered by power component 716 which may include batteries, power adapters, or any other power producing or providing component.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. Each of these example systems are configured based on the detailed disclosure herein and are therefore specific, in application, to the processes of content display.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art, upon reading this disclosure, for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl®, Python®, or TCL, as well as combinations thereof. The server(s) may also include database servers, including without limitation those commercially available from Oracle®, Microsoft®, Sybase®, and IBM®.

The environment can include a variety of databases and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, the embodiments above teach customization of hardware that may be used with software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause the system to:
   obtain, via an electronic interface, a campaign budget for an electronic advertising campaign, a number of interactions for the electronic advertising campaign, a plurality of simulated bid requests comprising price bids for advertisements, and a first time period intended for the electronic advertising campaign;
   obtain, from one or more advertising platforms, one or more simulated traffic patterns for a set of second time periods comprising weighted bid traffic from the advertising platforms,
   wherein the set of second time periods are subdivisions of the first time period,
   and wherein at least a portion of the one or more simulated traffic patterns are displayed via the electronic interface;
   for the electronic advertising campaign, determine, based on a first evaluation of the campaign budget, of the number of interactions, of the plurality of simulated bid requests, and of the first time period against the weighted bid traffic and the set of second time periods, that the campaign budget of the electronic advertising campaign has not been exhausted, wherein the first evaluation is initiated via the electronic interface;
   provide an update, via the electronic interface and based on the first evaluation, to one or more of the campaign budget, the number of interactions, the plurality of simulated bid requests, and the first time period;
   obtain, via the electronic interface, an acceptance of the update;
   for the electronic advertising campaign, identify, based on a second evaluation of the update, of the campaign budget, of the number of interactions, of the plurality of simulated bid request, and of the first time period against the weighted bid traffic and the set of second time periods, at least one qualified bid request based at least in part on an update to a price bid of one of the plurality of the simulated bid requests that results in completion of the campaign budget of the electronic advertising campaign, wherein the second evaluation is initiated at the electronic interface;
   provide, via the electronic interface and based at least in part on the second evaluation of the simulated traffic patterns, the at least one qualified bid request identified based on the second evaluation of the update; and
   apply the at least one qualified bid request to content servers of the one or more advertising platforms to secure content slots for displaying content associated with the electronic advertising campaign.

2. The system of claim 1, wherein the instructions when executed further cause the system to:
   obtain a file including the simulated traffic patterns;
   extract the simulated traffic patterns from the file; and
   provide the simulated traffic patterns to a simulation engine for generating the weighted bid traffic.

3. The system of claim 1, wherein the instructions when executed further cause the system to:

monitor performance parameters during performance of the electronic advertising campaign; and adjust at least one of the plurality of the simulated bid requests, the number of interactions, and the first time period.

4. The system of claim 1, wherein the instructions when executed further cause the system to:

for the electronic advertising campaign, obtain an associated advertisement uniform resource locators (URLs) and associated advertisement budgets; and determine, based at least in part from the campaign budget of the associated advertisement budgets, the plurality of simulated bid requests, the number of interactions, and the first time period.

5. A computer-implemented method, comprising:

obtaining, via an electronic interface, a set of rules that define a content campaign for electronic advertising comprising a campaign budget, a plurality of simulated bid requests comprising price bids for advertisements, a number of interactions for the content campaign, and a first time period intended for the content campaign;

obtaining, from one or more advertising platforms, one or more simulated traffic patterns for a set of second time periods representing simulated bidding traffic over a set of second time periods, wherein the set of second time periods are subdivisions of the first time period, and wherein at least a portion of the one or more simulated traffic patterns are displayed via the electronic interface;

determining, based on a first evaluation initiated at the electronic interface of the simulated traffic patterns against the set of rules wherein the evaluation includes a simulation of the content campaign, that the campaign budget of the content campaign has not been exhausted;

providing an update, via the electronic interface and based on the first evaluation, to one or more of the campaign budget, the number of interactions, the plurality of simulated bid requests, and the first time period;

obtaining, via the electronic interface, an acceptance of the update;

identifying, based on a second evaluation initiated at the electronic interface of the simulated traffic patterns, of the update, and of the set of rules, at least one qualified bid request based at least in part on an update to a price bid of one of the plurality of the simulated bid requests that results in completion of the campaign budget of the content campaign; and providing, via the electronic interface and based at least in part on the second evaluation of the simulated traffic patterns, the at least one qualified bid request identified based on the second evaluation.

6. The computer-implemented method of claim 5, further comprising:

obtaining a file including the simulated traffic patterns;

extracting the simulated traffic patterns from the file; and providing the simulated traffic patterns to a simulation engine for evaluating the set of rules.

7. The computer-implemented method of claim 5, further comprising:

monitoring performance parameters during performance of the content campaign; and adjusting at least one of the set of rules based on a change in at least one monitored performance parameter.

8. The computer-implemented method of claim 7, further comprising:

obtaining the content campaign, the content campaign comprising advertisement budgets; and determining, based at least in part from the advertisement budgets, at least one of the campaign budget, the plurality of simulated bid requests, the number of interactions, or the first time period.

9. The computer-implemented method of claim 7, wherein the content campaign comprises an advertisement uniform resource locator (URL).

10. The computer-implemented method of claim 5, further comprising:

initiating the content campaign in response to applying one of the qualified bid requests to a content server.

11. The computer-implemented method of claim 5, further comprising:

providing advertisement content from a content server in accordance with the content campaign.

12. The computer-implemented method of claim 5, further comprising:

obtaining a file including the simulated traffic patterns, the simulated traffic patterns comprised in a pattern of a time, and related weights for individual bid requests;

extracting the time and the related weights for the individual bid requests; and providing the time and the related weights for the individual bid requests to a simulation engine for evaluating the set of rules.

13. The computer-implemented method of claim 5, further comprising:

for the content campaign, assigning the plurality of simulated bid requests, the number of interactions, and the first time period to exhaust the campaign budget as defined in the set of rules;

for the content campaign, obtaining, from one or more advertising platforms, a file including the simulated traffic patterns for the set of second time periods, wherein the set of second time periods represent subdivisions of the first time period and related weights for bid traffic from the advertising platforms;

evaluating the simulated traffic patterns wherein the evaluation includes a simulation of the content campaign based in part on one or more of the number of interactions, the set of second time periods, and the related weights such that the campaign budget is exhausted after the set of second time periods;

generating at least one qualified bid request based on at least evaluating the simulated traffic patterns; and providing the at least one qualified bid request corresponding to the content campaign.

14. The computer-implemented method of claim 5, further comprising:

monitoring performance parameters during performance of the content campaign; and determining to change or maintain the set of rules in accordance with a difference between actual interactions and simulated interactions.

15. A non-transitory computer-readable storage medium storing instructions that, when executed by at least one processor of a computing system, cause the computing system to:

obtain, via an electronic interface, a set of rules that define a content campaign for electronic advertising comprising a campaign budget, a plurality of simulated bid requests comprising price bids for advertisements, a number of interactions for the content campaign, and a first time period intended for the content campaign;

obtain, from one or more advertising platforms, one or more simulated traffic patterns for a set of second time periods representing simulated bidding traffic over a set of second time periods, wherein the set of second time periods are subdivisions of the first time period, and wherein at least a portion of the one or more simulated traffic patterns are displayed via the electronic interface;

determine, based on a first evaluation initiated at the electronic interface of the simulated traffic patterns against the set of rules wherein the evaluation includes a simulation of the content campaign, that the campaign budget of the content campaign has not been exhausted;

provide an update, via the electronic interface and based on the first evaluation, to one or more of the campaign budget, the number of interactions, the plurality of simulated bid requests, and the first time period;

obtain, via the electronic interface, an acceptance of the update;

identify, based on a second evaluation initiated at the electronic interface of the simulated traffic patterns, of the update, and of the set of rules, at least one qualified bid request based at least in part on an update to a price bid of one of the plurality of the simulated bid requests that results in completion of the campaign budget of the content campaign; and provide, via the electronic interface and based at least in part on the second evaluation of the simulated traffic patterns, the at least one qualified bid request.

16. The non-transitory computer-readable storage medium of claim 15, wherein in the instructions when executed further cause the computing system to:

obtain a file including the simulated traffic patterns;

extract the simulated traffic patterns from the file; and provide the simulated traffic patterns to a simulation engine for evaluating the set of rules.

17. The non-transitory computer-readable storage medium of claim 15, wherein in the instructions when executed further cause the computing system to:

monitor performance parameters during performance of the content campaign; and adjust at least one of the set of rules based on a change in at least one monitored performance parameter.

* * * * *